US008528441B2

(12) United States Patent
Baic

(10) Patent No.: US 8,528,441 B2
(45) Date of Patent: Sep. 10, 2013

(54) HANDLE FOR LATCHING MECHANISM

(75) Inventor: Zeljko Baic, Sylmar, CA (US)

(73) Assignee: Avibank Manufacturing, Inc., North Hollywood, CA (US)

( * ) Notice: Subject to any disclaimer, the term of this patent is extended or adjusted under 35 U.S.C. 154(b) by 278 days.

(21) Appl. No.: 13/007,468

(22) Filed: Jan. 14, 2011

(65) Prior Publication Data

US 2012/0180595 A1 Jul. 19, 2012

(51) Int. Cl.
*F16C 1/12* (2006.01)
*G05G 5/06* (2006.01)

(52) U.S. Cl.
CPC .................................... *G05G 5/06* (2013.01)
USPC ........................................ 74/501.6; 74/543

(58) Field of Classification Search
USPC .................. 74/501.6, 502, 502.2, 502.4, 526, 74/543, 557; 70/1.5, 241, 256, 257; 244/129.1, 244/129.4, 118.5, 1 R
See application file for complete search history.

(56) References Cited

U.S. PATENT DOCUMENTS

| | | | | |
|---|---|---|---|---|
| 2,581,080 | A * | 1/1952 | Cushman | 74/501.5 R |
| 3,169,409 | A * | 2/1965 | Babacz | 74/471 R |
| 3,831,406 | A * | 8/1974 | Gebhard et al. | 70/1.5 |
| 3,831,409 | A * | 8/1974 | Gebhard et al. | 70/241 |

* cited by examiner

*Primary Examiner* — James Pilkington
*Assistant Examiner* — Richard Urbanski
(74) *Attorney, Agent, or Firm* — James M. Duncan, Esq.; Klein DeNatale Goldner

(57) ABSTRACT

A handle apparatus utilized for actuating mechanisms with a pair of parallel cables detects a cable out condition, and prevents further activation of the actuated mechanism. The apparatus has a yoke mechanism which is pivotally attached to an activation rod, which in turn is connected to an activation handle. The yoke mechanism has a first side and a second side, with one of the cables attached to the first side and the other cable attached to the second side. The yoke mechanism has a first stop member attached to the first side of the yoke mechanism and a second stop member attached to the second side of the yoke mechanism. The apparatus has stationary shoulders which are placed such that the stationary shoulders will engage the stop members if either cable fails.

17 Claims, 10 Drawing Sheets

HANDLE FOR LATCHING MECHANISM

BACKGROUND OF THE INVENTION

The invention relates to various mechanisms which are operated by applying tension or compression with actuating cables and more particularly to latch mechanisms, such as some aircraft latches which are cable actuated latches. One of the drawbacks of utilizing cable actuation for various mechanisms is that for some systems, particularly those in which the cables are hidden, such as behind panels or covers, it is not immediately ascertainable that a cable has failed. In such cases, manipulation of a handle or lever may provide a false indication that the apparatus has been manipulated as desired, when in fact the cable failure has prevented actuation of the mechanism. In the case of latches, a handle might be manipulated such that the handle indicates that the latch is open or closed, when the latch has not been activated because of a cable failure. In some cases, particularly with aircraft devices, it is imperative that the status of the device be immediately ascertainable, such as whether the device has been manipulated as desired.

SUMMARY OF THE INVENTION

Embodiments of the disclosed apparatus detect a cable out condition for cable actuated mechanisms, providing an immediate indication to the operator of a problem with a cable. In a dual cable system, if one of the cables has failed the handle is prevented from achieving either the open position or the closed position. An embodiment of the apparatus comprises an activation handle for operating the particular mechanism, where the activation handle has a first position which indicates a first condition and a second position which indicates a second condition. The disclosed apparatus may be utilized with mechanisms which are actuated by parallel cables, including mechanisms which are actuated by the application of tension in the cables ("pull") or compression ("push").

In the case of a latch, the activation handle has a latch open position and a latch closed position, corresponding with the desired latch operation. It is to be appreciated that the disclosed apparatus may be used for latches which are opened by application of tension, or closed by operation of tension, thus the indications on the figures of "open" and "closed" are for illustrative purposes only. The apparatus further comprises means for operationally attaching parallel actuating cables to the activation handle, such that the activation handle may apply a uniform tension or compression to the cables. Such means may comprise a yoke mechanism which is pivotally attached to an activation rod, which in turn is connected to the activation handle. The yoke mechanism has a first side and a second side, with a first cable attached to the first side and a second cable attached to the second side. The yoke mechanism has a first stop member attached to the first side of the yoke mechanism and a second stop member attached to the second side of the yoke mechanism. The apparatus has a stationary first shoulder which is placed such that it will engage the first stop member if the first cable fails, because a failed cable will cause the yoke mechanism to pivot and operation of the activation handle drives a portion of the first stop member into the first stationary shoulder, stopping further motion of the activation handle. Likewise, if the second cable fails, the yoke mechanism will pivot in the opposite direction and a portion of the second stop member will be pulled into the stationary second shoulder and further motion of the activation handle will be stopped.

DETAILED DESCRIPTION OF THE EMBODIMENTS

Figure 1:
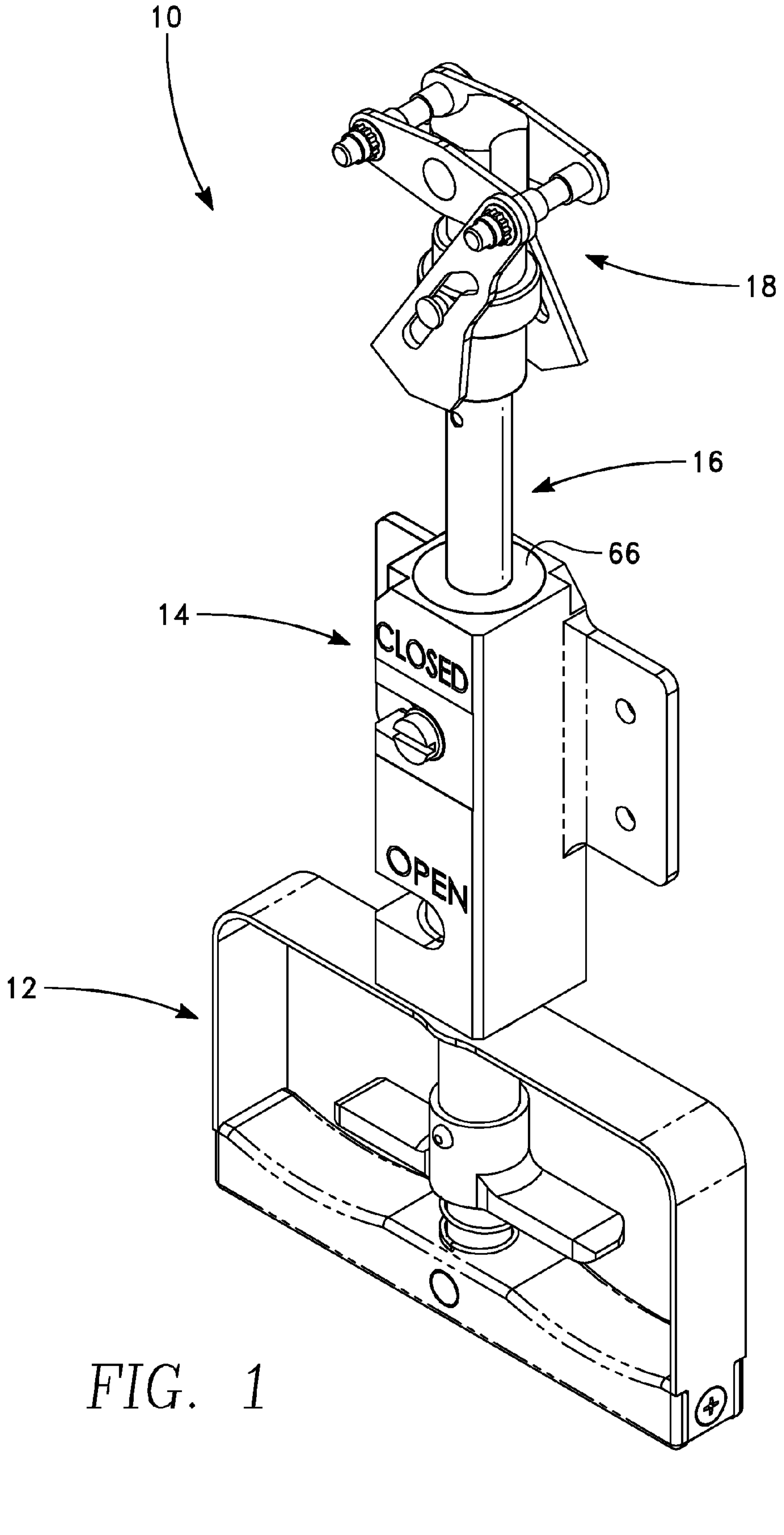
FIG. 1 shows a right side perspective view of an embodiment of the invention.
Figure 2:
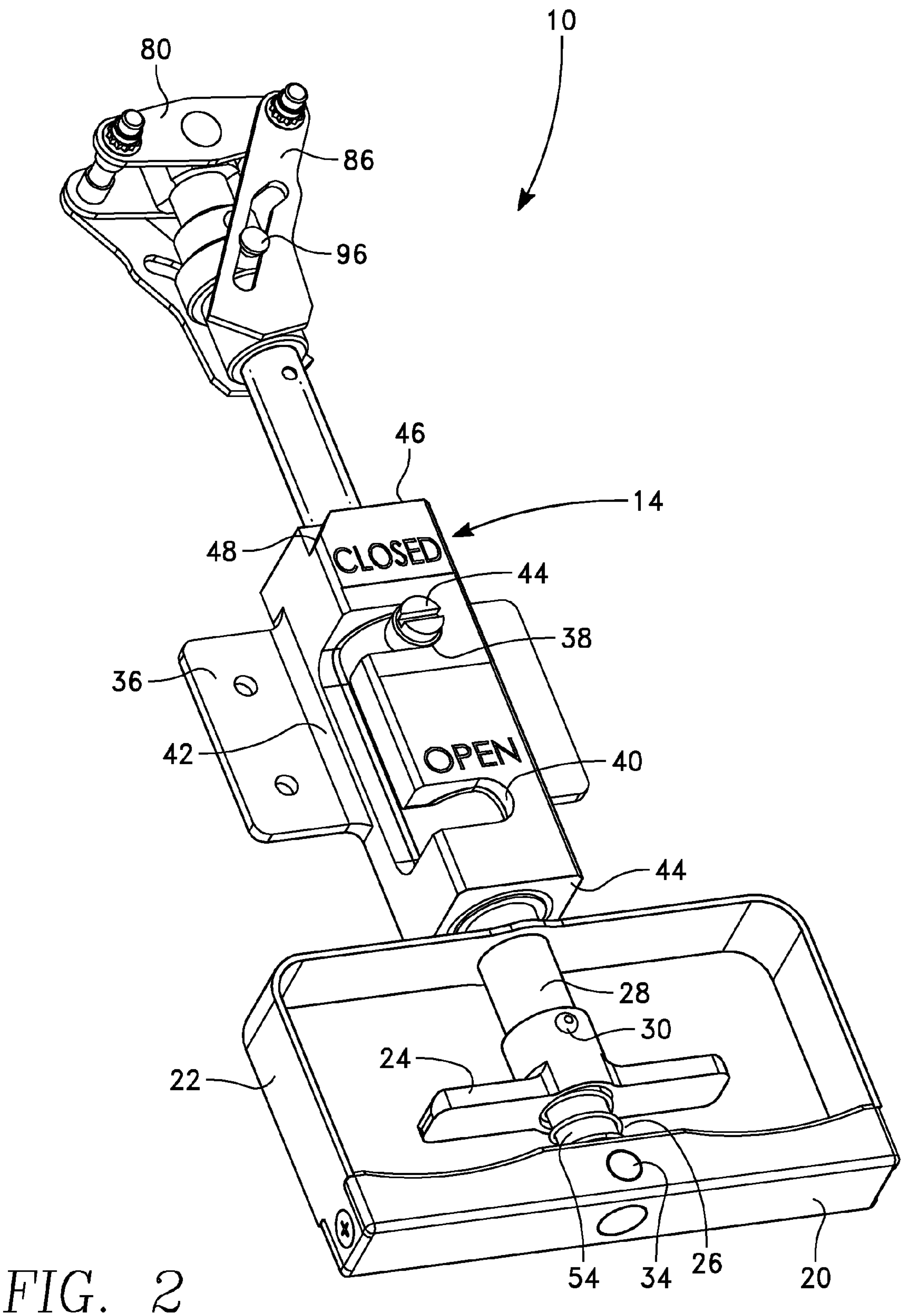
FIG. 2 shows a left side perspective view of an embodiment of the invention.
Figure 3:
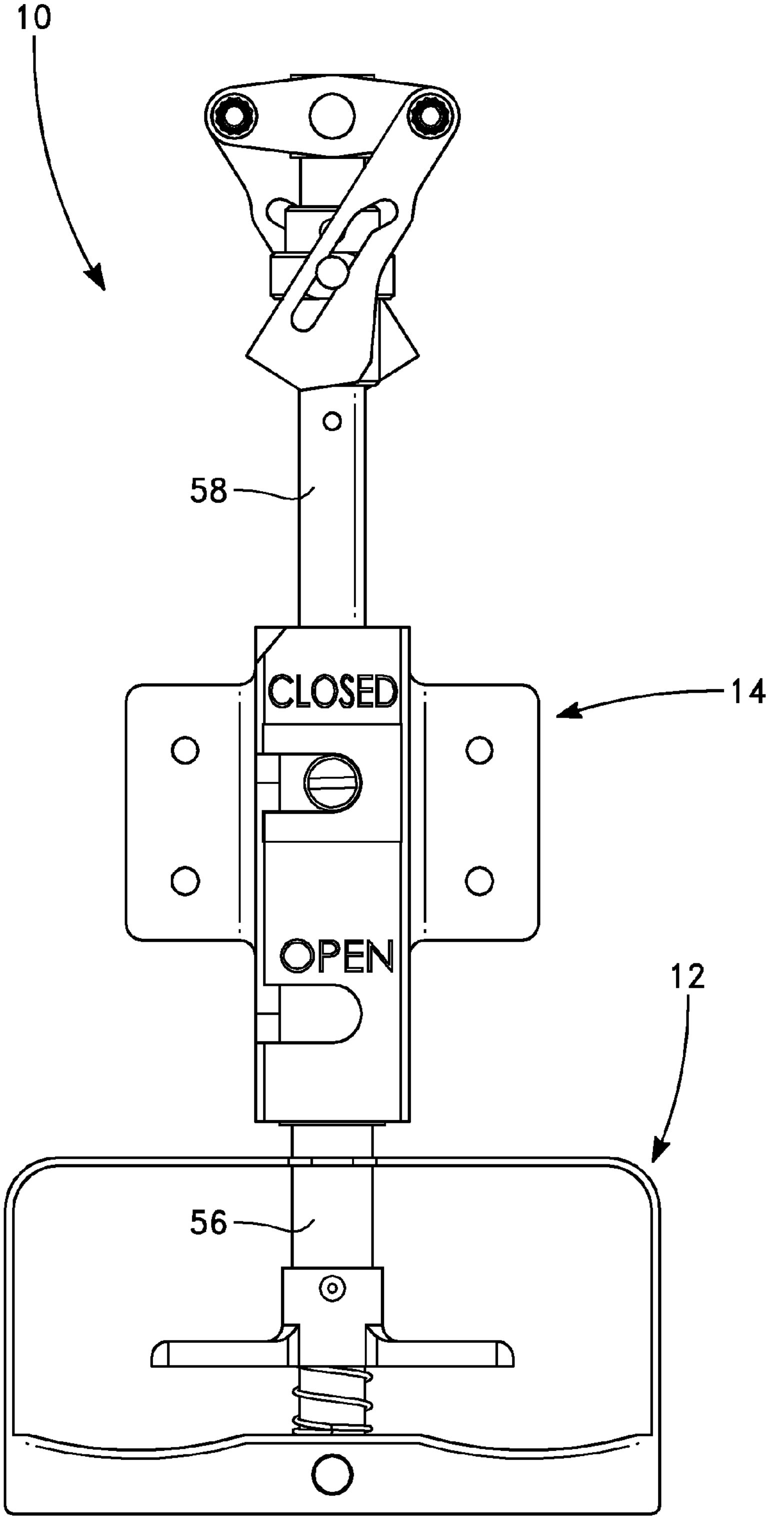
FIG. 3 shows a front view of an embodiment of the invention.
Figure 4:
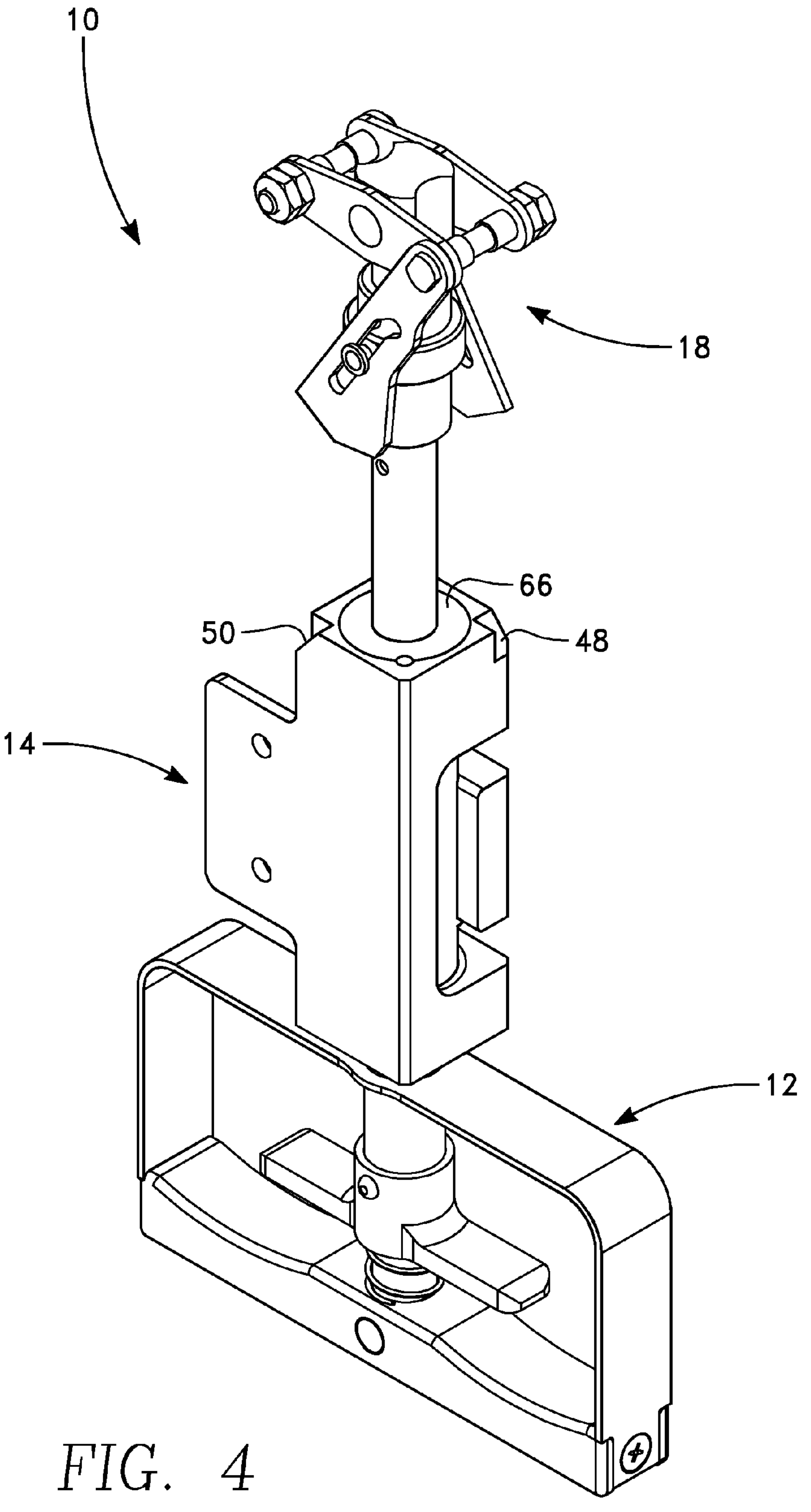
FIG. 4 shows a rear perspective view of an embodiment of the invention.
Figure 5:
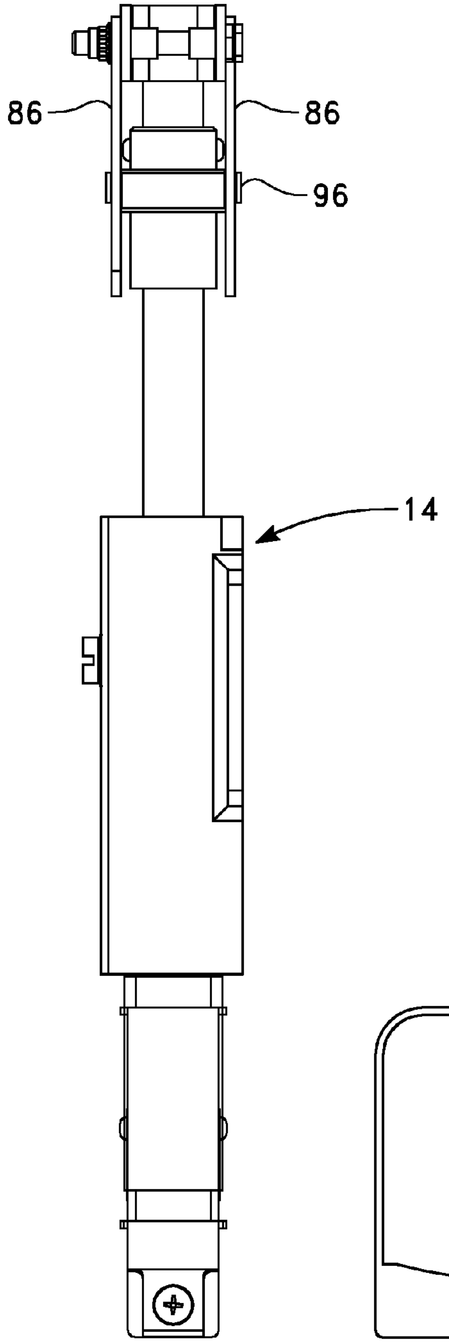
FIG. 5 shows a left side view of an embodiment of the invention.
Figure 6:
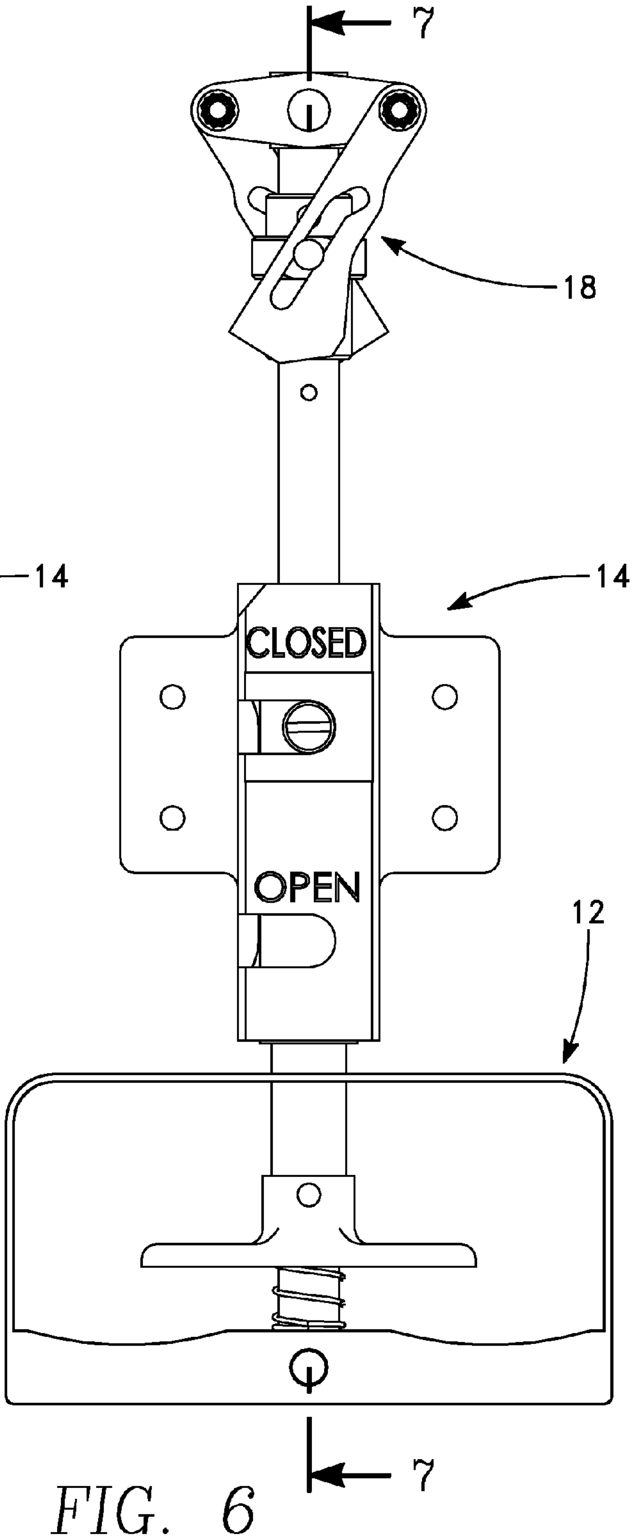
FIG. 6 shows a front view of an embodiment of the invention.

Referring now to the Figures, an embodiment of the disclosed apparatus 10 is depicted. An embodiment of the apparatus 10 has a handle assembly 12, a housing 14, an operating rod assembly 16, and a cable attachment assembly 18. References made below to the top, bottom, or sides of the apparatus 10 will be with respect to the orientation of the apparatus as depicted in FIG. 1, although it is to be appreciated that the apparatus will function in any orientation. It is also noted that the embodiments of the apparatus 10 shown in the Figures include the labels "closed" and "open" and generally refer to the utilization of the device with latches, particularly aircraft latches. Thus, for the embodiment depicted in FIG. 1, the rotation and shifting of the handle assembly 12 in a downward direction would result in a latch attached to the apparatus with parallel cables to be in the "open" position. However, the same apparatus might be utilized to close a latch by the same handle movement.

It is to be further appreciated that the apparatus 10 may be employed with other types of mechanisms besides latches. Any mechanism which is actuated by cables, either by push-pull actuation or by application of tension or compression, is a potential candidate for use in combination with the disclosed apparatus.

Figure 10:
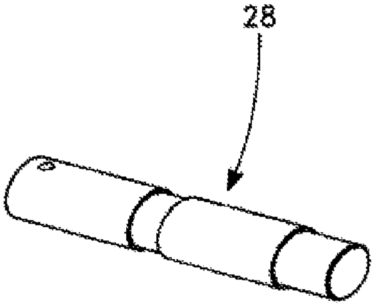
FIG. 10 shows a perspective view of an embodiment of a spindle utilized in embodiments of the disclosed apparatus.

Handle assembly 12 may comprise a grip member 20 which is attached to a D-handle 22. Handle assembly 12 further comprises a trigger 24 which is maintained in position biased apart from grip member 20 by biasing means, such as spring 26. Handle assembly 12 is attached to spindle 28, to which trigger 24 is attached by rivet 30. Spindle 28, shown in greater detail in FIG. 10, slides over shaft 54 to which grip member 20 is attached by rivet 34 or other fastening means. Trigger 24 freely travels over shaft 54 until rivet 34 reaches the top of a slot 62 in shaft 54, at which point trigger 24 initiates movement in shaft 54

Housing 14 has integral mounting means such as attachment plate 36, which maintains housing 14 in a stationary position during the operation of the apparatus 10. As shown in the figures, housing 14 has at least a first selection slot 38 and a second selection slot 40, which are generally oriented normal to the long axis of the housing. The selection slots 38, 40 are connected to one another by linking slot 42. This configuration provides at least two positions for engagement of lock screw 44 within housing 14. For the embodiment shown in the figures, when the lock screw 44 engages the first selection slot 38, the apparatus being actuated by the cables is in the closed position Likewise, when the lock screw 38 engages the second selection slot 40, the operated apparatus is in the open position. Of course, additional selection slots may be located within housing 14, providing a variety of intermediate positions between selection slots 38, 40 as required by the functioning of the particular apparatus being actuated by the apparatus 10. Linking slot 42 is generally oriented along the long axis of housing 14 as shown in the figures. As shown in the figures, housing 14 may comprise a generally rectangular shape having a long axis coinciding with the long axis of the shaft 54 which slides within housing 14. Housing 14 further comprises a handle end 32 and a cable end 46. The cable end 46 of the housing 14 may comprise a first shoulder 48 and a second shoulder 50, which are utilized as described in greater detail below.

Figure 7:
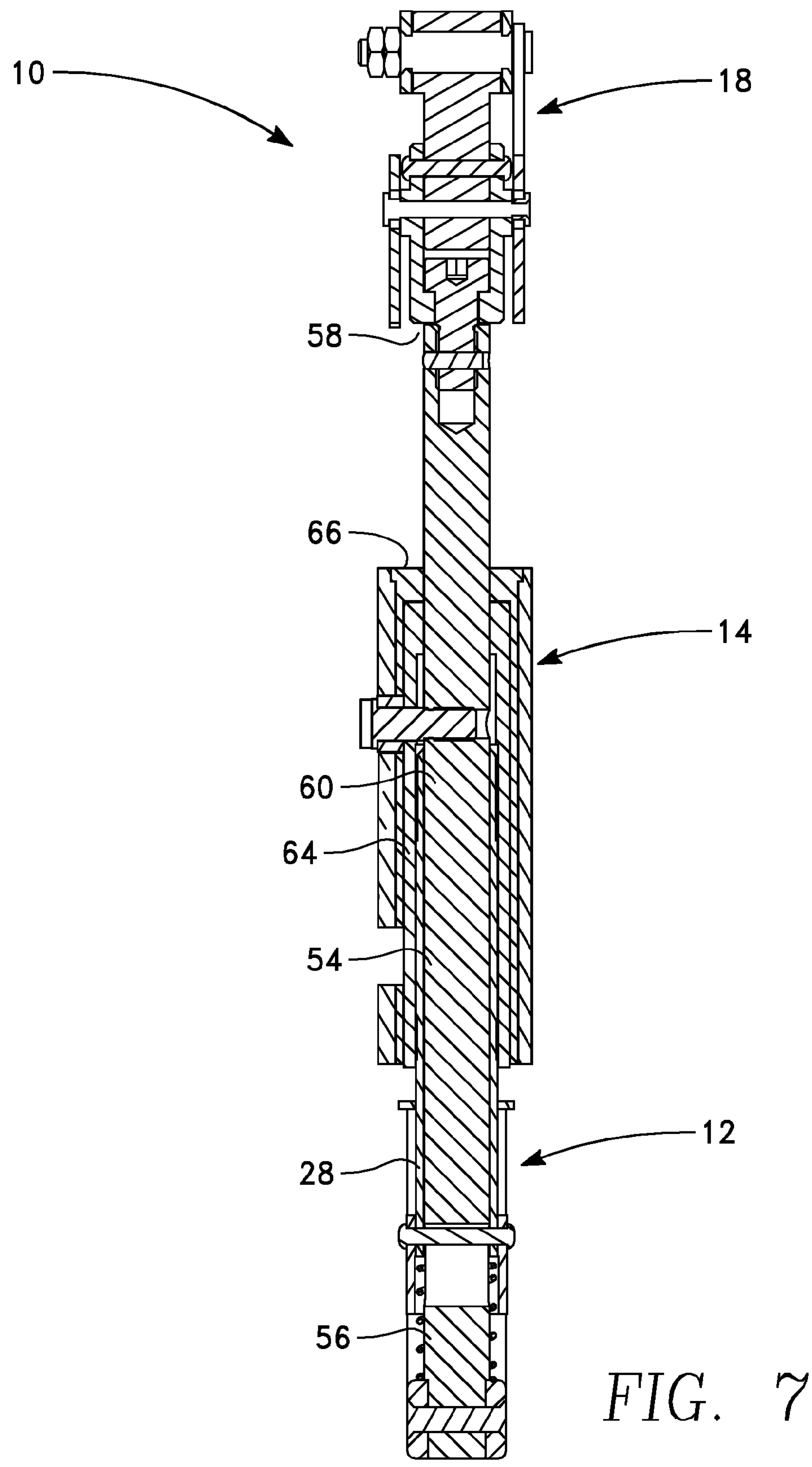
FIG. 7 shows a sectioned view taken along line 7-7 of FIG. 6.
Figure 11:
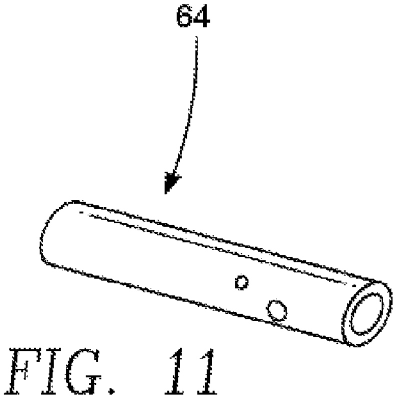
FIG. 11 shows a perspective view of an embodiment of a sleeve utilized in embodiments of the disclosed apparatus.
Figure 12:
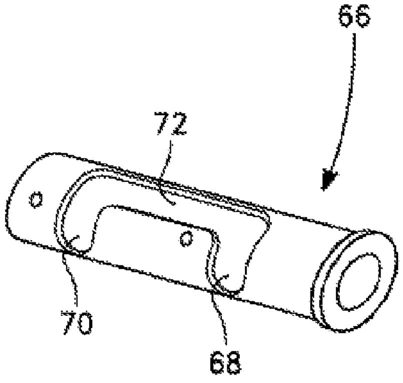
FIG. 12 shows a perspective view of an embodiment of a bushing utilized in embodiments of the disclosed apparatus.

The operating rod assembly 16 is utilized to transmit the linear motion of the handle assembly 12 to cables 52, and interacts with housing 14 to lock the operating rod assembly in various positions with respect to housing 14, such that a desired tension is maintained in cables 52 for manipulation of the mechanism actuated by the cables. As shown in the sectional view of FIG. 7, the operating rod assembly comprises a shaft 54 having a portion of the shaft slidingly disposed within housing 14. Shaft 54 comprises a handle end 56, a cable end 58, and an intermediate section 60 which slides within housing 14. Shaft 54 further comprises a slot 62 which allows trigger 24 free travel as it is pulled toward grip member 20. Operating rod assembly 16 may further comprise a sleeve 64, as shown in detail in FIG. 11, which encircles a portion of shaft 54. A guide bushing 66 is set within housing 14, where the guide bushing guides the operating rod assembly 16 through the housing 14, where the guide bushing has slots 68, 70 and 72 which are respectively aligned with the selection slots 38, 40 and linking slot 42 of the housing. Lock screw 44 is made up through an opening in sleeve 64 and attached into opening 74 of shaft 54.

Figure 8:
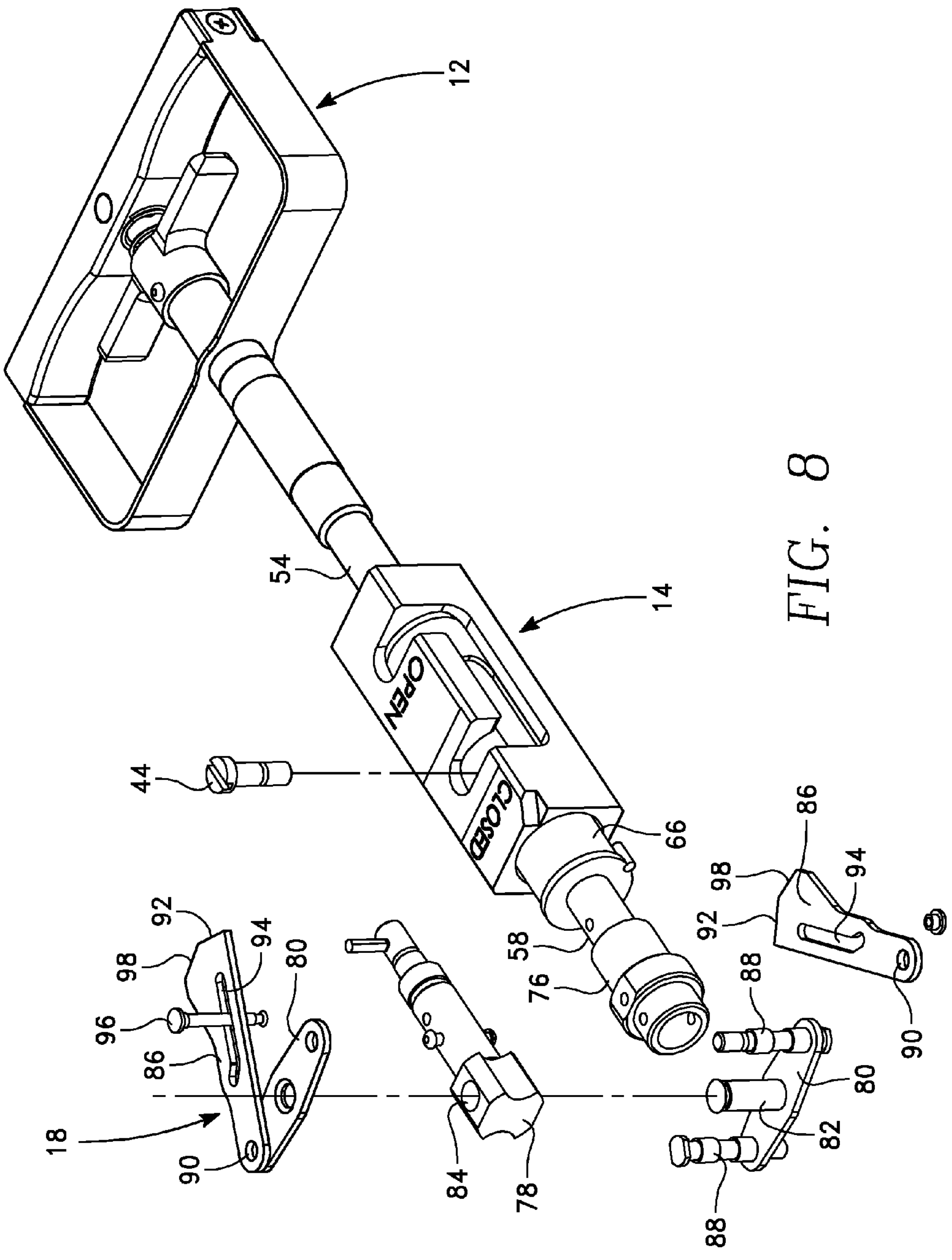
FIG. 8 shows a perspective view of an embodiment of the invention, with the cable attachment mechanism shown in exploded detail.
Figure 9:
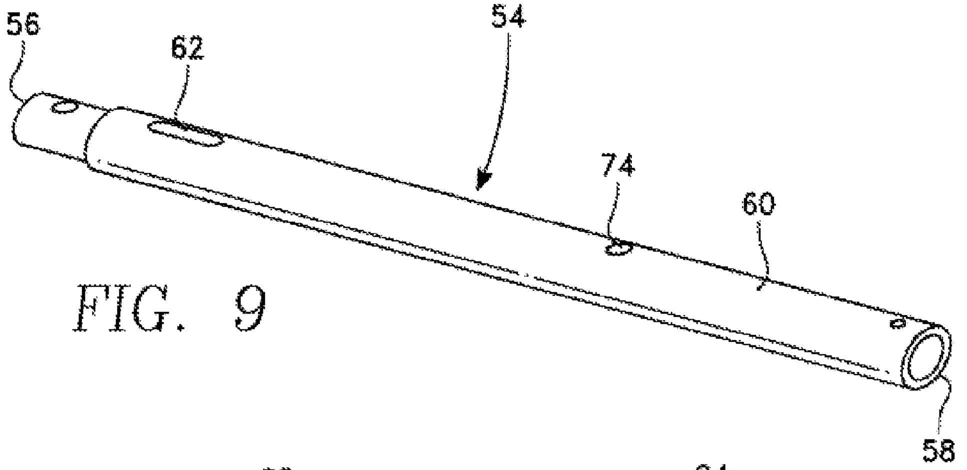
FIG. 9 shows a perspective view of an embodiment of a shaft utilized in embodiments of the disclosed apparatus.

As best shown in FIG. 8, cable attachment assembly 18 is attached to the cable end 58 of shaft 54. Attached to the cable end 58 of the shaft is rod bushing 76. Inserted within the end of rod bushing 76 and pinned and/or riveted in place is connector 78. Pivotally attached to the top of connector 78 are links 80, or yoke members, which pivot about shaft 82, which may comprise a rivet, fastener or similar member, which is inserted in opening 84 of connector 78. Pivotally attached to links 80 are stop arms 86, where a first stop arm is attached to one side of connector 78 and a second stop arm is attached to the opposite side by rivets 88 or like device. Each stop arm 86 has a top 90 and a bottom 92. A length is defined between the top 90 and the bottom 92, and a slot 94 extends along a portion of the length. A rivet 96, fastener, or like device is inserted through a portion of the slot 94 of each stop arm 86, where the rivet 96 is inserted through rod bushing 76, such that the stop arms 86 are free to slide along the rivet 96 for the length of the slots, such that each stop arm 86 may slide with respect to the rivet 96. The bottom 92 of each stop arm 86 has shoulder stop contact surface 98.

Figure 13:
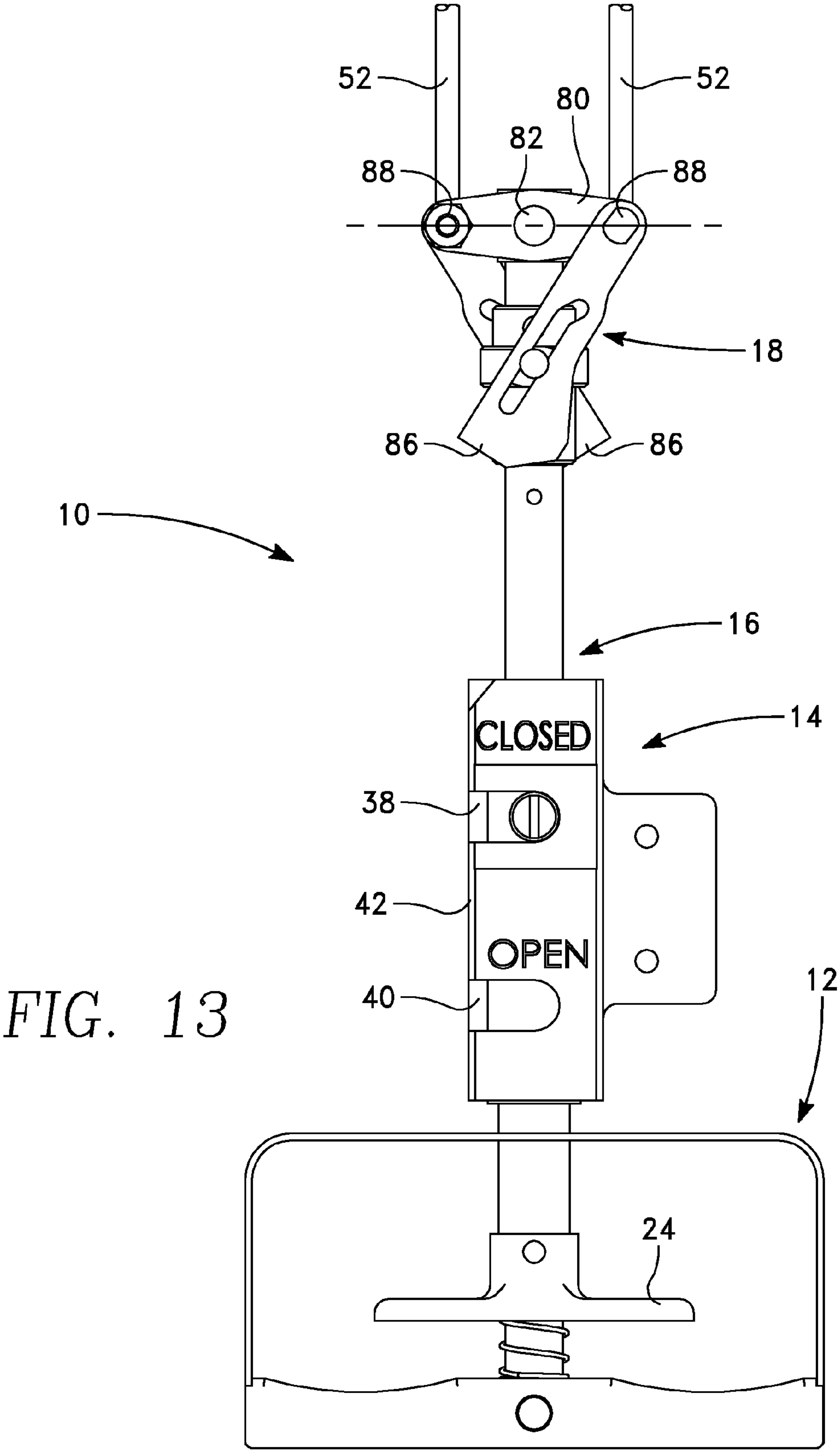
FIG. 13 shows an embodiment of the invention with cables attached.

As shown in FIG. 13, cables 52 are attached to links 80. FIG. 13 shows the apparatus in a static condition in which, because of equivalent tension in cables 52, the links 80 are in a balanced position, with the load evenly applied to shaft 82. In order to operate the apparatus 10, trigger 24 must be pulled toward grip member 20. Once trigger 24 is pulled a sufficient length to initiate movement in the operating rod assembly 16, grip member 20 and trigger 24 are rotated in a direction which moves lock screw 44 from selection slot 38 into linking slot 42. Handle assembly 12 is then pulled away from housing 14 a sufficient distance to place lock screw 44 adjacent to selection slot 40, at which point grip member 20 and trigger 24 are rotated in a direction to move lock screw 44 into selection slot 40.

Figure 14:
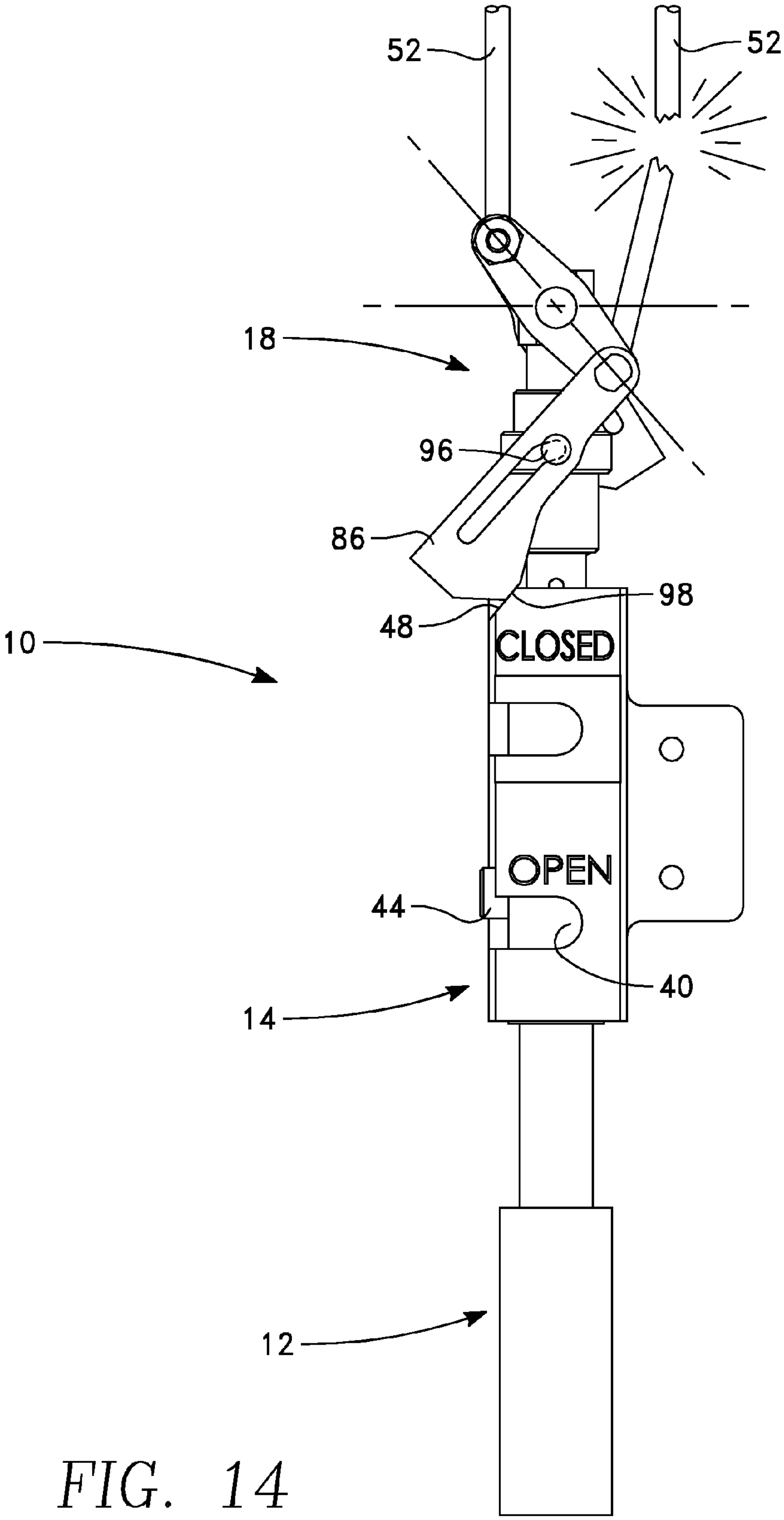
FIG. 14 shows the embodiment of FIG. 13 and how the device locks out in the event of a cable failure.

FIG. 14 depicts what occurs in the event of a cable failure. As illustrated in FIG. 14, one of the cables 52 has failed. If this occurs, during the sequence described above, as the handle assembly 12 is pulled away from the housing 14, the links 80 pivot downward on the side of the cable failure, causing the stop arm 86 to slide with respect to rivet 96, causing shoulder stop contact surface 98 to come into engaging contact with first shoulder 48, or second shoulder 50, depending upon which cable fails. Once shoulder contact surface 98 comes into engaging contact with first shoulder 48 or second shoulder 50, further movement of the shaft 82 is stopped, and the lock screw is prevented from engaging selection slot 40, and the handle assembly 12 will not be moveable any further. Thus, the operator of the apparatus is provided an affirmative indication of a cable failure and the cables cannot be moved so as to actuate the particular mechanism.

While the above is a description of various embodiments of the present invention, further modifications may be employed without departing from the spirit and scope of the present invention. Thus the scope of the invention should not be limited according to these factors, but according to the following appended claims.

What is claimed is:

1. An apparatus for providing an indication of a cable failure for mechanisms actuated by a first cable and a second cable operating in parallel, the apparatus comprising:

an activation handle for actuating the mechanism, the handle having a first position and a second position;

a yoke member having a first side and a second side, with the first cable attached to the first side and the second cable attached to the second side;

a shaft attached to the activation handle, the shaft having a first end and a second end, the first end attached to the activation handle and the second end comprising pivotal attachment means, the yoke member attached to the pivotal attachment means;

a first stop member attached to the first side of the yoke member and a second stop member attached to the second side of the yoke member; and a stationary housing member comprising a stationary first shoulder for engaging the first stop member if the first cable fails and a stationary second shoulder for engaging the second stop member if the second cable fails, wherein the activation handle is prevented from engaging the first position by either engagement of the first shoulder with the first stop member or the engagement of the second shoulder with the second stop member.

2. The apparatus of claim 1 wherein the stationary housing member further comprises a handle end and a cable end and an opening extending from the handle end to the cable end where the shaft is slidingly disposed within the opening.

3. The apparatus of claim 1 wherein the shaft comprises a lock screw extending radially outward from the shaft.

4. The apparatus of claim 3 wherein the stationary housing member comprises a first selection slot and a second selection slot, wherein the lock screw engages the first selection slot when the activation handle is in the first position and the lock screw engages the second selection slot when the activation handle is in the second position.

5. The apparatus of claim 1 wherein the first stop member comprises a first stop arm comprising a top and a bottom, wherein a first length is defined between the top and the bottom, the first stop member comprising a first slot extending along a portion of the first length and second stop member comprises a second stop arm comprising a top and a bottom, wherein a second length is defined between the top and the bottom, the second stop arm comprising a second slot extending along a portion of the second length.

6. An apparatus for operating a latch by applying tension to a first cable and a second cable where the apparatus prevents the latch from opening if one of the cables fails, the apparatus comprising:

an activation handle for opening and closing the latch, the activation handle having a latch open position and a latch closed position;

a yoke member having a first side and a second side, with the first cable attached to the first side and the second cable attached to the second side;

a shaft attached to the activation handle, the shaft having a first end and a second end, the first end attached to the activation handle and the second end comprising pivotal attachment means, the yoke member attached to the pivotal attachment means;

a first stop member attached to the first side of the yoke member and a second stop member attached to the second side of the yoke member; and a stationary housing member comprising a stationary first shoulder for engaging the first stop member if the first cable fails and a stationary second shoulder for engaging the second stop member if the second cable fails, wherein the actuation handle is prevented from engaging the latch open position by either engagement of the first shoulder with the first stop member or the engagement of the second shoulder with the second stop member.

7. The apparatus of claim 6 wherein the stationary housing member further comprises a handle end and a cable end and an opening extending from the handle end to the cable end where the shaft is slidingly disposed within the opening.

8. The apparatus of claim 6 wherein the shaft comprises a lock screw extending radially outward from the shaft.

9. The apparatus of claim 8 wherein the stationary housing member comprises a first selection slot and a second selection slot, wherein the lock screw engages the first selection slot when the activation handle is in the latch closed position and the lock screw engages the second selection slot when the activation handle is in the latch open position.

10. The apparatus of claim 6 wherein the first stop member comprises a first stop arm comprising a top and a bottom, wherein a first length is defined between the top and the bottom, the first stop member comprising a first slot extending along a portion of the first length and second stop member comprises a second stop arm comprising a top and a bottom, wherein a second length is defined between the top and the bottom, the second stop arm comprising a second slot extending along a portion of the second length.

11. An apparatus for operating a latch by applying tension to a first cable and a second cable where the apparatus prevents the latch from closing if one of the cables fails, the apparatus comprising:

an activation handle for opening and closing the latch, the activation handle having a latch open position and a latch closed position;

a yoke member having a first side and a second side, with the first cable attached to the first side and the second cable attached to the second side;

a shaft attached to the activation handle, the shaft having a first end and a second end, the first end attached to the activation handle and the second end comprising pivotal attachment means, the yoke member attached to the pivotal attachment means;

a first stop member attached to the first side of the yoke member and a second stop member attached to the second side of the yoke member; and a stationary housing member comprising a stationary first shoulder for engaging the first stop member if the first cable fails and a stationary second shoulder for engaging the second stop member if the second cable fails, wherein the apparatus is prevented from engaging the latch closed position by either engagement of the first shoulder with the first stop member or the engagement of the second shoulder with the second stop member.

12. The apparatus of claim 11 wherein the stationary housing member further comprises a handle end and a cable end and an opening extending from the handle end to the cable end where the shaft is slidingly disposed within the opening.

13. The apparatus of claim 11 wherein the shaft comprises a lock screw extending radially outward from the shaft.

14. The apparatus of claim 13 wherein the stationary housing member comprises a first selection slot and a second selection slot, wherein the lock screw engages the first selection slot when the activation handle is in the latch closed position and the lock screw engages the second selection slot when the activation handle is in the latch open position.

15. An apparatus for operating a mechanism, the apparatus comprising:

a first cable and a second cable operating in parallel, wherein when tension is applied to the first cable, tension is simultaneously applied to the second cable, and when tension is released from the first cable, tension is simultaneously released from the second cable;

the mechanism comprising:

a stationary housing having a first end and a second end, the stationary housing further comprising an opening extending from the first end to the second end, the second end of the stationary housing further comprising a first stop shoulder and a second stop shoulder;

a shaft slidingly disposed within the opening, the shaft comprising a handle end and a cable attachment end;

a bushing disposed on the shaft, the exterior of the bushing comprising a first outwardly extending male member and a second outwardly extending male member;

a yoke member having a center, a first side and a second side, the yoke member pivotally attached at the center to the cable attachment end, wherein an end of the first cable is attached to the first side of the yoke member and an end of the second cable is attached to the second side of the yoke member;

a first stop arm comprising a top and a bottom, wherein a first length is defined between the top and the bottom, the first stop arm comprising a first slot extending along a portion of the first length and the first outwardly extending male member is inserted through a portion of the first slot, the slot allowing the first stop arm to slide with respect to the first outwardly extending male member, the bottom of the first stop arm comprising a first shoulder stop contact surface; and a second stop arm comprising a top and a bottom, wherein a second length is defined between the top and the bottom, the second stop arm comprising a second slot extending along a portion of the second length and the second outwardly extending male member is inserted through a portion of the second slot, the slot allowing the second stop arm to slide with respect to the second outwardly extending male member, the bottom of the second stop arm comprising a second shoulder stop contact surface.

16. The apparatus of claim 15 wherein the shaft comprises a lock screw extending radially outward from the shaft.

17. The apparatus of claim 16 wherein the stationary housing comprises a first selection slot and a second selection slot, wherein the lock screw engages the first selection slot when a latch operated by the apparatus is a closed position and the lock screw engages the second selection slot when the latch is in an open position.

* * * * *